US009919197B2

(12) United States Patent
Cronin

(10) Patent No.: US 9,919,197 B2
(45) Date of Patent: *Mar. 20, 2018

(54) PLAYBOOK PROCESSOR

(71) Applicant: PROSPORTS TECHNOLOGIES, LLC, Miami, FL (US)

(72) Inventor: John E. Cronin, Bonita Springs, FL (US)

(73) Assignee: PROSPORTS TECHNOLOGIES, LLC, Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 15/479,151

(22) Filed: Apr. 4, 2017

(65) Prior Publication Data

US 2017/0203185 A1    Jul. 20, 2017

Related U.S. Application Data

(63) Continuation of application No. 14/798,035, filed on Jul. 13, 2015, now Pat. No. 9,610,491.

(60) Provisional application No. 62/023,348, filed on Jul. 11, 2014, provisional application No. 62/023,377, filed on Jul. 11, 2014.

(51) Int. Cl.
*A63B 71/06* (2006.01)

(52) U.S. Cl.
CPC .................... *A63B 71/06* (2013.01)

(58) Field of Classification Search
USPC .............................................. 700/91; 463/43
See application file for complete search history.

(56) References Cited

U.S. PATENT DOCUMENTS

| 3,586,326 | A | 6/1971 | McKenna |
| 3,825,261 | A | 7/1974 | Zapos |
| 3,856,302 | A | 12/1974 | Karkoska |
| 4,014,117 | A | 3/1977 | Vallillee |
| 4,763,284 | A | 8/1988 | Carlin |
| 4,771,394 | A | 9/1988 | Cavanagh |
| 5,293,354 | A | 3/1994 | Costabile |
| 5,462,275 | A | 10/1995 | Lowe et al. |
| 6,013,007 | A | 1/2000 | Root et al. |

(Continued)

FOREIGN PATENT DOCUMENTS

| AU | 2014100006 | 2/2014 |
| CN | 102527007 | 7/2012 |

(Continued)

OTHER PUBLICATIONS

"About Head Case", Head Case Company, Sep. 24, 2013.

(Continued)

*Primary Examiner* — Pierre E Elisca
(74) *Attorney, Agent, or Firm* — Polsinelli LLP

(57) ABSTRACT

Systems and methods for identifying recorded playbook plays are described. The method includes recording locations of one or more players during execution of a play and evaluating the recorded locations with one or more known plays in a playbook. Based on the evaluation, one or more plays can be identified as being most correlated with the recently executed play. The evaluation can also be used to compare how a particular player has been executing the playbook play (e.g., deviations). Use of the identified play can also be used to produce one or more counter-plays.

20 Claims, 9 Drawing Sheets

(56) References Cited

U.S. PATENT DOCUMENTS

| | | |
|---|---|---|
| 6,070,879 A | 6/2000 | Kemp |
| 6,181,236 B1 | 1/2001 | Schneider |
| 6,389,368 B1 | 5/2002 | Hampton |
| 6,603,711 B2 | 8/2003 | Calace |
| 6,629,104 B1 | 9/2003 | Parulski et al. |
| 6,760,276 B1 | 7/2004 | Karr |
| 6,836,744 B1 | 12/2004 | Asphahani et al. |
| 6,907,840 B1 | 6/2005 | Gaines |
| 7,020,336 B2 | 3/2006 | Cohen-Solal et al. |
| 7,031,225 B2 | 4/2006 | McDonald |
| 7,115,053 B2 | 10/2006 | Meichner |
| 7,173,533 B1 | 2/2007 | Beron et al. |
| 7,174,277 B2 | 2/2007 | Vock et al. |
| 7,561,494 B2 | 7/2009 | Stern |
| 7,561,723 B2 | 7/2009 | Goldberg et al. |
| 7,602,301 B1 | 10/2009 | Stirling et al. |
| 7,618,312 B1 | 11/2009 | Kasten |
| 7,634,662 B2 | 12/2009 | Monroe |
| 7,693,668 B2 | 4/2010 | Vock et al. |
| 7,715,723 B2 | 5/2010 | Kagawa et al. |
| 7,720,572 B2 | 5/2010 | Ziegler et al. |
| 7,805,149 B2 | 9/2010 | Werner et al. |
| 7,920,052 B2 | 4/2011 | Costabile |
| 7,924,323 B2 | 4/2011 | Walker et al. |
| 8,054,174 B1 | 11/2011 | Uehran |
| 8,098,881 B2 | 1/2012 | Camp et al. |
| 8,239,146 B2 | 8/2012 | Vock et al. |
| 8,253,586 B1 | 8/2012 | Matak |
| 8,257,084 B1 | 9/2012 | Kreiner et al. |
| 8,257,228 B2 | 9/2012 | Quartrochi et al. |
| 8,289,185 B2 * | 10/2012 | Alonso .................. H04Q 9/00 340/870.11 |
| 8,326,136 B1 | 12/2012 | Clark |
| 8,396,687 B2 | 3/2013 | Vock et al. |
| 8,477,046 B2 | 7/2013 | Alonso |
| 8,485,879 B2 | 7/2013 | Lin et al. |
| 8,554,495 B2 | 10/2013 | MacK et al. |
| 8,554,509 B2 | 10/2013 | Crisco et al. |
| 8,579,632 B2 | 11/2013 | Crowley |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,626,465 B2 | 1/2014 | Moore et al. |
| 8,630,216 B2 | 1/2014 | Deivasigamani et al. |
| 8,660,501 B2 | 2/2014 | Sanguinetti |
| 8,684,819 B2 | 4/2014 | Thomas et al. |
| 8,702,504 B1 | 4/2014 | Hughes et al. |
| 8,706,044 B2 | 4/2014 | Chang et al. |
| 8,724,723 B2 | 5/2014 | Panicker et al. |
| 8,724,909 B2 | 5/2014 | Quack |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 8,994,498 B2 | 3/2015 | Agrafioti et al. |
| 9,185,361 B2 | 11/2015 | Curry |
| 9,305,441 B1 | 4/2016 | Cronin |
| 9,398,213 B1 | 7/2016 | Cronin |
| 9,474,933 B1 | 10/2016 | Cronin |
| 9,502,018 B2 | 11/2016 | Cronin |
| 9,610,491 B2 | 4/2017 | Cronin |
| 9,652,949 B1 | 5/2017 | Cronin |
| 9,724,588 B1 | 8/2017 | Cronin |
| 9,792,285 B2 | 10/2017 | Reiley et al. |
| 9,795,858 B1 | 10/2017 | Cronin |
| 2001/0003715 A1 | 6/2001 | Jutzi et al. |
| 2001/0048484 A1 | 12/2001 | Tamir et al. |
| 2003/0163287 A1 | 8/2003 | Vock et al. |
| 2003/0210612 A1 | 11/2003 | Stern |
| 2004/0043843 A1 | 3/2004 | Ryan |
| 2005/0046584 A1 | 3/2005 | Breed |
| 2005/0117022 A1 | 6/2005 | Marchant |
| 2005/0162257 A1 | 7/2005 | Gonzalez |
| 2005/0242508 A1 | 11/2005 | Meichner |
| 2005/0277466 A1 | 12/2005 | Lock |
| 2006/0052147 A1 | 3/2006 | Matthews |
| 2006/0074338 A1 | 4/2006 | Greenwald et al. |
| 2006/0109089 A1 | 5/2006 | Boehm et al. |
| 2006/0180073 A1 | 8/2006 | Nakamoto |
| 2006/0208169 A1 | 9/2006 | Breed et al. |
| 2006/0281061 A1 | 12/2006 | Hightower et al. |
| 2007/0003113 A1 | 1/2007 | Goldberg |
| 2007/0135264 A1 | 6/2007 | Rosenberg |
| 2007/0269203 A1 | 11/2007 | Awazu |
| 2007/0279494 A1 | 12/2007 | Aman et al. |
| 2008/0082311 A1 | 4/2008 | Meijer et al. |
| 2008/0129825 A1 | 6/2008 | DeAngelis et al. |
| 2008/0146302 A1 | 6/2008 | Olsen et al. |
| 2009/0023122 A1 | 1/2009 | Lieberman et al. |
| 2009/0029754 A1 | 1/2009 | Slocum et al. |
| 2009/0111582 A1 | 4/2009 | Schuler et al. |
| 2009/0256912 A1 | 10/2009 | Rosenberg |
| 2010/0026809 A1 | 2/2010 | Curry |
| 2010/0030350 A1 | 2/2010 | House et al. |
| 2010/0102938 A1 | 4/2010 | Delia et al. |
| 2010/0105503 A1 | 4/2010 | Daisher et al. |
| 2010/0144414 A1 | 6/2010 | Edis et al. |
| 2010/0185398 A1 | 7/2010 | Berns et al. |
| 2010/0283630 A1 | 11/2010 | Alonso |
| 2011/0013087 A1 | 1/2011 | House et al. |
| 2011/0064281 A1 | 3/2011 | Chan |
| 2011/0169959 A1 | 7/2011 | DeAngelis et al. |
| 2011/0181418 A1 | 7/2011 | Mack et al. |
| 2011/0184320 A1 | 7/2011 | Shipps et al. |
| 2011/0248992 A1 | 10/2011 | van Os |
| 2011/0251802 A1 | 10/2011 | Song |
| 2012/0002509 A1 | 1/2012 | Saguin et al. |
| 2012/0029666 A1 | 2/2012 | Crowley et al. |
| 2012/0052947 A1 | 3/2012 | Yun |
| 2012/0063272 A1 | 3/2012 | Dorais et al. |
| 2012/0081531 A1 | 4/2012 | DeAngelis et al. |
| 2012/0099405 A1 | 4/2012 | Lidor et al. |
| 2012/0100911 A1 | 4/2012 | Rejen |
| 2012/0116259 A1 | 5/2012 | McConnell et al. |
| 2012/0116548 A1 | 5/2012 | Goree et al. |
| 2012/0120201 A1 | 5/2012 | Ward |
| 2012/0124720 A1 | 5/2012 | Evans et al. |
| 2012/0166449 A1 | 6/2012 | Pitaliya |
| 2012/0197998 A1 | 8/2012 | Kessel et al. |
| 2012/0202594 A1 | 8/2012 | Bistis et al. |
| 2012/0212505 A1 | 8/2012 | Burroughs et al. |
| 2012/0223833 A1 | 9/2012 | Thomas et al. |
| 2012/0324491 A1 | 12/2012 | Bathiche et al. |
| 2013/0018494 A1 | 1/2013 | Amini |
| 2013/0045806 A1 * | 2/2013 | Bloodworth ............... A63F 9/24 463/43 |
| 2013/0060168 A1 | 3/2013 | Chu et al. |
| 2013/0066448 A1 | 3/2013 | Alonso |
| 2013/0080222 A1 | 3/2013 | Quinn |
| 2013/0091209 A1 | 4/2013 | Bennett et al. |
| 2013/0095924 A1 | 4/2013 | Geisner et al. |
| 2013/0126713 A1 | 5/2013 | Haas et al. |
| 2013/0138590 A1 | 5/2013 | Huke et al. |
| 2013/0139068 A1 | 5/2013 | Bowring |
| 2013/0141555 A1 | 6/2013 | Ganick et al. |
| 2013/0166048 A1 | 6/2013 | Werner et al. |
| 2013/0222133 A1 | 8/2013 | Schultz et al. |
| 2013/0235702 A1 | 9/2013 | Saguin et al. |
| 2013/0249708 A1 | 9/2013 | Moll-Carrillo et al. |
| 2013/0279917 A1 | 10/2013 | Son et al. |
| 2013/0303192 A1 | 11/2013 | Louboutin |
| 2013/0314407 A1 | 11/2013 | Meehan |
| 2013/0316837 A1 | 11/2013 | Coiner, Jr. |
| 2013/0317835 A1 | 11/2013 | Mathew |
| 2013/0322689 A1 | 12/2013 | Carmichael |

(56) References Cited

U.S. PATENT DOCUMENTS

| | | |
|---|---|---|
| 2013/0324239 A1 | 12/2013 | Ur et al. |
| 2013/0328917 A1 | 12/2013 | Zambetti et al. |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0335635 A1 | 12/2013 | Ghanem et al. |
| 2013/0336662 A1 | 12/2013 | Murayama et al. |
| 2013/0343762 A1 | 12/2013 | Murayama et al. |
| 2014/0004939 A1 | 1/2014 | Kasten |
| 2014/0039354 A1 | 2/2014 | Greenwald et al. |
| 2014/0039355 A1 | 2/2014 | Crisco et al. |
| 2014/0039651 A1 | 2/2014 | Crowley |
| 2014/0062773 A1 | 3/2014 | MacGougan |
| 2014/0065962 A1 | 3/2014 | Le |
| 2014/0068847 A1 | 3/2014 | Kitowski |
| 2014/0071221 A1 | 3/2014 | Dave |
| 2014/0080638 A1 | 3/2014 | Feng et al. |
| 2014/0088454 A1 | 3/2014 | Mack |
| 2014/0105084 A1 | 4/2014 | Chhabra |
| 2014/0105466 A1 | 4/2014 | Botes et al. |
| 2014/0107817 A1 | 4/2014 | Ellis et al. |
| 2014/0111352 A1 | 4/2014 | Doherty |
| 2014/0125702 A1 | 5/2014 | Santillan et al. |
| 2014/0139380 A1 | 5/2014 | Ouyang |
| 2014/0141803 A1 | 5/2014 | Marti |
| 2014/0143940 A1 | 5/2014 | Luliano et al. |
| 2014/0155178 A1* | 6/2014 | Bloodworth ............ A63F 9/24 463/43 |
| 2014/0162628 A1 | 6/2014 | Bevelacqua |
| 2014/0167794 A1 | 6/2014 | Nath |
| 2014/0168170 A1 | 6/2014 | Lazarescu |
| 2014/0168477 A1 | 6/2014 | David |
| 2014/0171114 A1 | 6/2014 | Marti |
| 2014/0180820 A1 | 6/2014 | Louboutin |
| 2014/0191979 A1 | 7/2014 | Tsudik |
| 2014/0200053 A1 | 7/2014 | Balasubramanian |
| 2014/0218184 A1 | 8/2014 | Grant et al. |
| 2014/0222335 A1 | 8/2014 | Piemonte |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0269562 A1 | 9/2014 | Burchill |
| 2014/0270375 A1 | 9/2014 | Canavan et al. |
| 2014/0274150 A1 | 9/2014 | Marti |
| 2014/0278218 A1 | 9/2014 | Chang |
| 2014/0283135 A1 | 9/2014 | Shepherd |
| 2014/0293959 A1 | 10/2014 | Singh |
| 2014/0361906 A1 | 12/2014 | Hughes et al. |
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |
| 2014/0365194 A1 | 12/2014 | O'Hagan et al. |
| 2014/0365640 A1 | 12/2014 | Wohl et al. |
| 2014/0371887 A1 | 12/2014 | Hoffman et al. |
| 2014/0375217 A1 | 12/2014 | Feri et al. |
| 2015/0011242 A1 | 1/2015 | Nagaraj |
| 2015/0026623 A1 | 1/2015 | Horne et al. |
| 2015/0031397 A1 | 1/2015 | Jouaux |
| 2015/0081713 A1 | 3/2015 | Alonso et al. |
| 2015/0131845 A1 | 5/2015 | Forouhar et al. |
| 2015/0187188 A1 | 7/2015 | Raskin |
| 2015/0296272 A1 | 10/2015 | Sonabend et al. |
| 2015/0297649 A1 | 10/2015 | Aman et al. |
| 2015/0306457 A1 | 10/2015 | Crankson et al. |
| 2016/0001159 A1 | 1/2016 | Riley et al. |
| 2016/0008693 A1 | 1/2016 | Cronin |
| 2016/0012810 A1 | 1/2016 | Cronin |
| 2016/0018278 A1 | 1/2016 | Jeter |
| 2016/0073010 A1 | 3/2016 | Cronin |
| 2016/0089599 A1 | 3/2016 | Anderson et al. |
| 2016/0096074 A1 | 4/2016 | Moll-Carrillo et al. |
| 2016/0098941 A1 | 4/2016 | Kerluke |
| 2016/0107064 A1 | 4/2016 | Hoffman et al. |

FOREIGN PATENT DOCUMENTS

| | | |
|---|---|---|
| CN | 102843186 | 12/2012 |
| EP | 2 407 218 | 1/2012 |
| WO | WO 2008/030484 | 3/2008 |
| WO | WO 2009/104921 | 8/2009 |
| WO | WO 2011/004381 | 1/2011 |
| WO | WO 2012/100053 | 7/2012 |
| WO | WO 2013/011259 | 1/2013 |
| WO | WO 2013/166456 | 11/2013 |
| WO | WO 2014/008134 | 1/2014 |
| WO | WO 2014/052874 | 4/2014 |
| WO | WO 2014/100519 | 6/2014 |
| WO | WO 2016/007969 | 1/2016 |
| WO | WO 2016/007970 | 1/2016 |
| WO | WO 2016/039991 | 3/2016 |

OTHER PUBLICATIONS

"Adidas' miCoach SPEED_CELL and miCoach Football App Aim to Advance the Performance of Next-Generation Athletes Through New Technology", miCoach, Nov. 22, 2011.

"Advanced E-Team: Automatic Sports Time Stopping Whistle", Rose-Hulman Institute of Technology, 2002, NCIIA Funded Advanced E-Teams. Date of Download: Jun. 14, 2014. http://www.nciia.org/WebObjects/NciiaResources.woa/wa/View/GrantProfile?n=1000037.

"Affordable Concussion Management System for Young Athletes Offered By Head Case", Head Case Company, Sep. 24, 2013.

Ancona et al., N.; "Goal detection in football by using Support Vector Machines for classification" Neural Networks, vol. 1, pp. 611-616, 2001.

"AutoScout" ADSC Illinous at Singapore Pte Ltd. Sep. 21, 2015.

Belzer, Jason; "NFL Partners With Zebra Technologies To Provide Next Generation Player Tracking", Forbes/Sports Money, Jul. 31, 2014.

Brolinson et al., P. Gunner; "Analysis of Linear Head Accelerations from Collegiate Football Impacts", Current Sports Medicine Reports, 2006, vol. 5:23-28.

"Chapter 29. Outdoor Laser Operations", U.S. Department of Transportation, Feb. 9, 2012.

Cooley, Chris; "MMQB: Smart Football", The Official Blog of Chris Cooley, Jul. 13, 2009.http://chriscooley47.blogspot.com/2009/07/mmqb-smart-football.html.

"Create Innovative Services with Play APPs", Date of Download: Jan. 16, 2014, http://www.oledcomm.com/LIFI.html, Oledcomm—France LiFi.

Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf>pp. 1244-1248.

Dawson, Keith; "LiFi in the Real World" All LED Lighting—Illuminating the LED Community, Jul. 31, 2013.

Delgado, Rick; "Why Fantasy Football Is Embracing Big Data", Sporttechie, Jan. 3, 2014.

"Dutch Football Fans Get the Ajax Experience With AV Technology From Electrosonic", Electrosonic Press Release, May 14, 2012.

FAQ, Go Pro Workouts, Date of Download: Apr. 30, 2014 https://www.goproworkouts.com/faqs.

"First Down Laser Systems to enhance game of football and fans in-stadium experience with green line", Sports Techie, Sep. 9, 2013.

"Football Workout Programs", Go Pro Workouts. Date of Download: Apr. 27, 2014 https://www.goproworkouts.com/workouts/football.

Freeman, Mark; "Frickin' Laser Beams", River Valley Leader, Feb. 19, 2013.

Gerhardt, Ryan; "Concussion Sensing Helmet Could Save Athletes", PSFK, Oct. 28, 2013.

(56) References Cited

OTHER PUBLICATIONS

Gerhardt, Ryan; "Vibrating Jersey Lets Fans Feel What Players Do on the Field", PSFK.com, Mar. 13, 2014.
"GoalControl to provide goal-line system at World Cup in Brazil", BBC Sport, Apr. 2, 2013.
Gorman, Michael; "Outstanding Technology brings visible light communication to phones and tablets via dongle and LEDs", Edgadget International Editions, Jul. 16, 2012.
"Growing data sets alter Sportsvision's real-time viewing experience", Sports Illustrated, More Sports, Nov. 29, 2013.
Harald; "Delivering safe and secure wireless communications", pureLiFi. Date of download: Jan. 16, 2014 http://purelifi.co.uk/.
"How to compare personal stats with the Pros?", Support Home Discussions Traning with miCoach. Jul. 4, 2012.
"How to wear the Stride Sensor (inside the shoe)", by micoach, Guides & Tutorials, May 29, 2014.
Inamoto et al., Naho; "Immersive Observation of Virtualized Soccer Match at Real Stadium Model", Proceedings of the Second IEEE and ACM International Symposium on Mixed and Augmented Reality (ISMAR '03), 2003.
"Intel, NFL Legend Jerry Rice and others Team Up to "Look Inside the Huddle" On and Off the Field", by INTELPR in Intel Newsroom, Aug. 28, 2013.
Kumar, Navin; "Visible Light Communications Systems Conception and VIDAS", IETE Technical Review, vol. 25, Issue 6, Nov.-Dec. 2008. Date of download: Nov. 19, 2009.
La Confora, Jason; "NFL collecting data that could revolutionize websites, video games", CBS Sports—NFL Insider, Nov. 25, 2012.
Laviers, Kennard R.; Sukthankar, Gita; "Using Opponent Modeling to Adapt Team Play in American Football", Plan, Activity, and Recognition, Elsevier, 2014. School of ECE, Air Force Institute of Technology. Preprint submitted: Oct. 31, 2013.
LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
Macleod, Robert; "New football helmet sensors monitor brain injuries", The Globe and Mail, Nov. 14, 2013.
Madden, Lance; "Pro Athletes Share Personal Workout Secrets With Startup 'Go Pro Workouts'", Forbes.com, SportsMoney. Mar. 4, 2013.
Maricle, Charles; "Federal rules for outdoor laser user in the U.S. (FAA authority over airspace)", Laser PointerSafety.com, Apr. 23, 2014.
"Methods to Our Madness", Football Outsiders Information, Innovative Statistics, Intelligent Analysis, http://www.footballoutsiders.com/info/methods, Date of Download: Apr. 10, 2014.
Miller, Mark J.; "NFL Sensors Will Track Player Stats for Fans, but What About Safety?", Sports in the Spotlight—brandchannel, Aug. 11, 2014.
Montero, Eric, "Design and Implementation of Color-Shift Keying for Visible Light Communications", Sep. 2013, McMaster University.
Morgan, Debra; "Referee Uses Capital Idea to Stop Game Clocks on a Whistle", Loca News. Nov. 18, 1999. http://www.wral.com/news/local/story/138889.
Naidu, Vinaya; "Watched The IPL? Now Find and Tag Yourself in the Stadium With Vodafone Fancam", Business 2 Community, May 22, 2013.
"New courtside technology unveiled at PISD tourney", Precision Time Systems—New Inventions That Prevent Human Errors in Sports Timekeeping, Date of Download: Apr. 23, 2014.
Nguyen et al., "A Novel like switching scheme using pre-scanning and RSS prediction in visible light communication networks", EURASIP Journal on Wireless Communications and Networking, 2013.
"Nike+ SportBand User's Guide", by nikeplus.com, Jun. 7, 2014.

"Nokia Lumia 920 pricing compared to iPhone 5 and Samsung Galaxy SIII", by Nokia, Sep. 30, 2012.
Ogawa; "Article about VLC Guidance developed", Visible Light Communications Consortium (VLCC), Aug. 31, 2012.
Ogawa; "iPhone app from CASIO", Visible Light Communications Consotium (VLCC), Apr. 26, 2012.
Ogus, Simon; "SportIQ Announces a Game Changing Real-Time Basketball Analytics Platform", Sporttechie.com, Mar. 7, 2014.
"OMEGA introduces new timing equipment for ice hockey at Sochi 2014 Olympic Winter Games", Omega Watches, Feb. 16, 2014.
"Outdoor Laser Operations", Advisory Circular, U.S. Department of Transportation, Dec. 30, 2014.
Perin et al., Charles; "Real-Time Crowdsourcing of Detailed Soccer Data", IEEE, Oct. 2013.
Povey, Gordon, "VLC for Location, positioning and navigation", Jul. 27, 2011, http://visiblelightcomm.com/vlc-for-location-positioning-and-n . . . .
"Riddell InSite Impact Response System", Riddell InSite. Oct. 18, 2013.
Roble, Bob; "Inside the Huddle: How Big Data Is Unlocking Fantasy Football Insights", IQ Sports—Sports Technology, Sep. 3, 2013.
Saag, Tonis; "You can compare your training data with friends again", SportlyzerBlog, Feb. 20, 2013.
"What is SafeBrain", SafeBrain Systems Inc. May 14, 2014.
Schoonmaker, Aaron; "NCAA ignoring own clock recommendations in tourney", WRALSportsFan.com, Mar. 25, 2014 http://www.wralsportsfan.com/ncaa-ignoring-own-clock-recommendations-in-tourney/13510770/.
"Smartabase—The complete solution for athlete data management", Fusion Sport, www.fusionsport.com, Jul. 21, 2011.
Spagnolo et al, "Non-Invasive Soccer Goal Line Technology: A Real Case Study," 2013 IEEE Conference on Computer Vision and Pattern Recognition Workshops.
"Sports Event Services—Quality Information is the first gold medal at any event", Infostrada Sports, May 24, 2013.
Stein, Anne; "Devices help alert teams to potential concussions on the field", Tribune Newspapers, Jun. 27, 2012.
Thanigavel, M.; "Li-Fi Technology in Wireless Communication", International Journal of Engineering Research & Technology (IJERT), ISSN: 2278-0181, vol. 2 Issue 10, Oct. 2013.
"The Head Case Impact Sensor", Head Case Company, Sep. 24, 2013.
"The System Models & How They Work", Precision Time Systems—New Inventions That Prevent Human Errors in Sports Timekeeping, Date of Download: Apr. 24, 2014.
"The Wearables Coaching an Optimal Version of You", by PSFK Labs, iQ, Feb. 24, 2014.
"Train like professional athletes", Go Pro Workouts. Date of Download: Apr. 30, 2014 https://www.goproworkouts.com/.
"Viewing other miCoach stats", Support Home Discussions Training with miCoach, Jun. 26, 2012.
WKO—Hunter Allen—Peaks Coaching Group Oct. 14, 2015.
"Wirless Whistle System", Bodet Sport, Sport Display—Timer. Date of Download: Jun. 23, 2014 file:///C|/king/AOP/Wireless%20Whistle%20system.htm[Jun. 23, 2014 7:32:06 PM].
Won, Eun Tae; "Visible Light Communication: Tutorial", Project: IEEE P802.15 Working Group for Wireless Personal Area Networks (WPANs), Mar. 9, 2008.
"Link: Would You Like to See the Goal-Post Lengthened in Height in College Football", TideFans.com, May 6, 2014. http://www.tidefans.com/forums/showthread.php?t=222422&page=4.
PCT Application No. PCT/US2015/033613 International Search Report and Written Opinion dated Sep. 1, 2015.
PCT Application No. PCT/US2015/040228 International Search Report and Written Opinion dated Sep. 30, 2015.
PCT Application No. PCT/US2015/040229 International Search Report and Written Opinion dated Oct. 1, 2015.
PCT Application No. PCT/US2015/047059 International Search Report and Written Opinion dated Nov. 9, 2015.
U.S. Appl. No. 14/798,035 Office Action dated Nov. 24, 2015.
U.S. Appl. No. 14/798,049 Final Office Action dated Mar. 22, 2016.
U.S. Appl. No. 14/798,049 Office Action dated Nov. 3, 2015.

(56) References Cited

OTHER PUBLICATIONS

U.S. Appl. No. 14/798,057 Office Action dated Nov. 24, 2015.
U.S. Appl. No. 14/798,068 Office Action dated Sep. 28, 2016.
U.S. Appl. No. 14/798,068 Final Office Action dated May 5, 2016.
U.S. Appl. No. 14/798,068 Office Action dated Nov. 23, 2015.
U.S. Appl. No. 14/798,081 Office Action dated Sep. 28, 2015.
U.S. Appl. No. 15/187,100 Office Action dated Apr. 14, 2017.
U.S. Appl. No. 14/798,091 Final Office Action dated May 2, 2017.
U.S. Appl. No. 14/798,091 Office Action dated Aug. 18, 2016.
U.S. Appl. No. 14/798,091 Final Office Action dated Mar. 28, 2016.
U.S. Appl. No. 14/798,091 Office Action dated Sep. 22, 2015.
U.S. Appl. No. 14/798,131 Final Office Action dated Mar. 21, 2017.
U.S. Appl. No. 14/798,131 Office Action dated Sep. 20, 2016.
U.S. Appl. No. 14/798,131 Final Office Action dated May 23, 2016.
U.S. Appl. No. 14/798,131 Office Action dated Jan. 12, 2016.
U.S. Appl. No. 15/091,139 Office Action dated Jan. 11, 2017.
U.S. Appl. No. 14/798,204 Final Office Action dated Apr. 11, 2017.
U.S. Appl. No. 14/798,204 Office Action dated Dec. 20, 2016.
U.S. Appl. No. 14/798,204 Final Office Action dated May 11, 2016.
U.S. Appl. No. 14/798,204 Office Action dated Jan. 22, 2016.
U.S. Appl. No. 14/798,190 Office Action dated Mar. 8, 2017.
U.S. Appl. No. 14/798,190 Final Office Action dated Jul. 25, 2016.
U.S. Appl. No. 14/798,190 Office Action dated Jan. 12, 2016.
U.S. Appl. No. 14/829,598 Final Office Action dated Jul. 18, 2016.
U.S. Appl. No. 14/829,598 Office Action dated Feb. 2, 2016.
U.S. Appl. No. 14/788,728 Office Action dated May 10, 2017.
U.S. Appl. No. 14/788,728 Final Office Action dated Dec. 6, 2016.
U.S. Appl. No. 14/788,728 Office Action dated Jul. 13, 2016.
U.S. Appl. No. 14/788,728 Final Office Action dated Feb. 1, 2016.
U.S. Appl. No. 14/788,728 Office Action dated Sep. 17, 2015.
U.S. Appl. No. 14/788,742 Office Action dated May 11, 2016.
U.S. Appl. No. 14/788,742 Final Office Action dated Jan. 6, 2016.
U.S. Appl. No. 14/788,742 Office Action dated Sep. 2, 2015.
U.S. Appl. No. 15/333,711, John E. Cronin, Professional Workout Simulator, filed Oct. 25, 2016
U.S. Appl. No. 14/798,068, John E. Cronin, Player Hit System, filed Jul. 13, 2015.
U.S. Appl. No. 15/187,100, John E. Cronin, Smart Field Goal Detector, filed Jun. 20, 2016.
U.S. Appl. No. 14/798,091, John E. Cronin, Real-Time Data Collection and Selective Storage, filed Jul. 13, 2015.
U.S. Appl. No. 14/798,131, John E. Cronin, Real-Time Data Collection and Storage for Use in Fantasy Football, filed Jul. 13, 2015.
U.S. Appl. No. 14/798,204, John E. Cronin, Movement Monitoring Unit, filed Jul. 13, 2015.
U.S. Appl. No. 14/798,190, John E. Cronin, Player Movement Data Drives Video Game, filed Jul. 13, 2015.
U.S. Appl. No. 14/788,728, John E. Cronin, Player Movement Data, filed Jun. 30, 2015.
U.S. Appl. No. 14/798,091 Office Action dated Oct. 3, 2017.
U.S. Appl. No. 14/788,728 Final Office Action dated Nov. 24, 2017.
U.S. Appl. No. 14/798,204 Office Action dated Dec. 1, 2017.
U.S. Appl. No. 14/798,190 Final Office Action dated Dec. 15, 2017.

\* cited by examiner

FIG 3
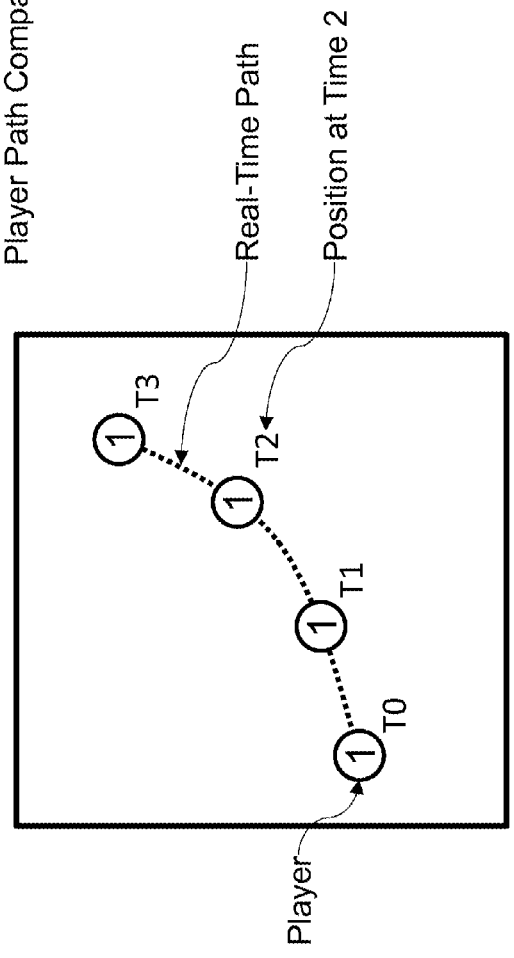
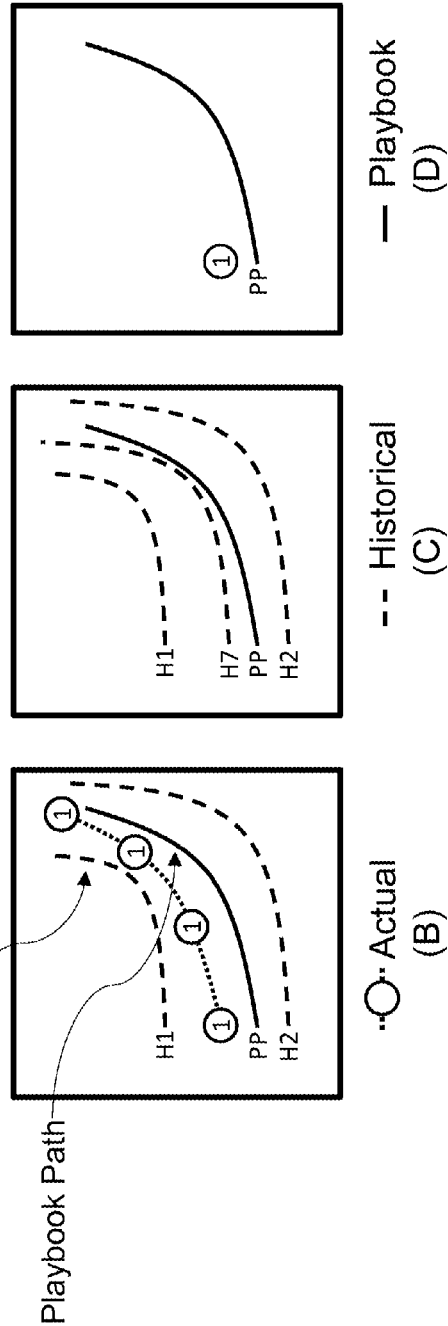

FIG. 6 - Pre-snap Defensive Shifts

FIG. 8 – Coach and Fan GUI

PLAYBOOK PROCESSOR

CROSS-REFERENCE TO RELATED APPLICATIONS

The present application is a continuation of and claims priority to U.S. patent application Ser. No. 14/798,035 filed Jul. 13, 2015 and entitled "Playbook Processor," now issued U.S. Pat. No. 9,610,491, which claims the priority benefit of U.S. provisional application No. 62/023,348 filed Jul. 11, 2014 and entitled "Playbook Processor" and U.S. provisional application No. 62/023,377 filed Jul. 11, 2014 and entitled "Playbook Response Processor," the disclosures of which are incorporated herein by reference.

BACKGROUND OF THE INVENTION

Field of Invention

The present invention generally relates to collecting sports data. More specifically, the present invention relates to a playbook processor.

Description of the Related Art

Collection of sports data has been performed (e.g., U.S. Pat. No. 8,289,185) through the use of one or more sensors mounted, affixed, or embedded on at least one sports participant (i.e., a player playing in a sporting event). The sports data may include identification of the sports participant as well as corresponding movement, position or condition of the sports participant during the sporting event. This sports data can be collected, processed and rebroadcasted to one or more viewers (e.g., coaches, medical professionals, general public/fans) for a variety of different uses. For example, the sports data may be used to monitor the health condition of the sports participants.

Another use of the sports data may include displaying the location of every player on the playing field of the sporting event. The location of each player may be displayed on a virtual display replicating the current state of the game that can further be used by commentators, coaches and fans to view real-time video of the sports participants and see the actions of the players with respect to the playing field (i.e., a play from the playbook).

There is no current available way for a user (e.g., opposing coach, fan) to know in real time what play from a playbook will be executed from each respective team (i.e., offense, defense) before the play is carried out. Furthermore, there is no current way to evaluate how well each sports participant is executing a particular play or how well the particular play is being performed overall.

SUMMARY OF THE CLAIMED INVENTION

A method for identifying a recorded playbook play is described. The method includes obtaining a starting location of one or more players on a team. During execution of a play, successive locations for the one or more players are recorded at regular intervals. By evaluating the recorded execution of the play with one or more known plays in a playbook, a playbook processor can identify one or more corresponding plays in the playbook that correspond to the recently executed play. The identified one or more possible plays from the playbook can then be displayed on a user interface for a user to view.

A system for identifying a recorded playbook play is described. The system includes a user interface and a playbook processor. The playbook processor obtains a starting location of one or more players on a team. During execution of a play, successive locations for the one or more players are recorded at regular intervals. By evaluating the recorded execution of the play with one or more known plays in a playbook, a playbook processor can identify one or more corresponding plays in the playbook that correspond to the recently executed play. The identified one or more possible plays from the playbook can then be displayed on the user interface for a user to view.

A method for identifying a counter offensive play based on a detected defensive play is described. The method includes obtaining starting locations of the players on the offense and defense. By recording shifts in the defense, a playbook processor can evaluate the recorded shifts with known defensive plays in a playbook. The playbook processor can identify one or more possible defensive play corresponding to the recorded shifts. In situations where the current play has a low success rate, the playbook processor can identify one or more counter-plays that can be used whereby the counter-plays have a higher success rate against the detected defensive play. The information from the playbook processor can be displayed on a user interface for a user to view.

A system for identifying a counter offensive play based on a detected defensive play is described. The system includes a user interface and a playbook processor. The playbook processor obtains starting locations of the players on the offense and defense teams. By recording shifts in the defense, a playbook processor can evaluate the recorded shifts with known defensive plays in a playbook. The playbook processor can identify one or more possible defensive play corresponding to the recorded shifts. In situations where the current play has a low success rate, the playbook processor can identify one or more counter-plays that can be used whereby the counter-plays have a higher success rate against the detected defensive play. The information from the playbook processor can be displayed on a user interface for a user to view

BRIEF DESCRIPTION OF THE DRAWINGS

FIG. 3 illustrates an evaluation of one particular player during an offensive play.

DETAILED DESCRIPTION

The systems and methods described herein are directed towards providing information regarding potential plays from a playbook. More specifically, by utilizing the ability to track sports data of each sports participant (or player) on the playing field (e.g., geolocation), the systems and methods described herein can predict what plays may be executed, how well each player is executing the play and information pertaining to the execution of the play (e.g., number of attempts, average number of yards).

The information regarding plays from a playbook can be provided to a variety of different parties of interest. Coaches may find this information beneficial to evaluate how well their respective teams are executing a given play and determine when the play should be used. The coaches may also use this information to observe and predict what plays the opposing team could possibly execute. Fans could use this information to further immerse their viewing experience when viewing the sporting event.

It should be noted that the embodiments described herein when describing the present invention are directed towards the sport of American football. The embodiments, however, are not solely limited to American football. Other sports, such as basketball, soccer and hockey may also utilize the present invention in order to provide users the ability to monitor the location of each of the players playing the game and evaluate performance of the plays executed by the players.

Figure 1:
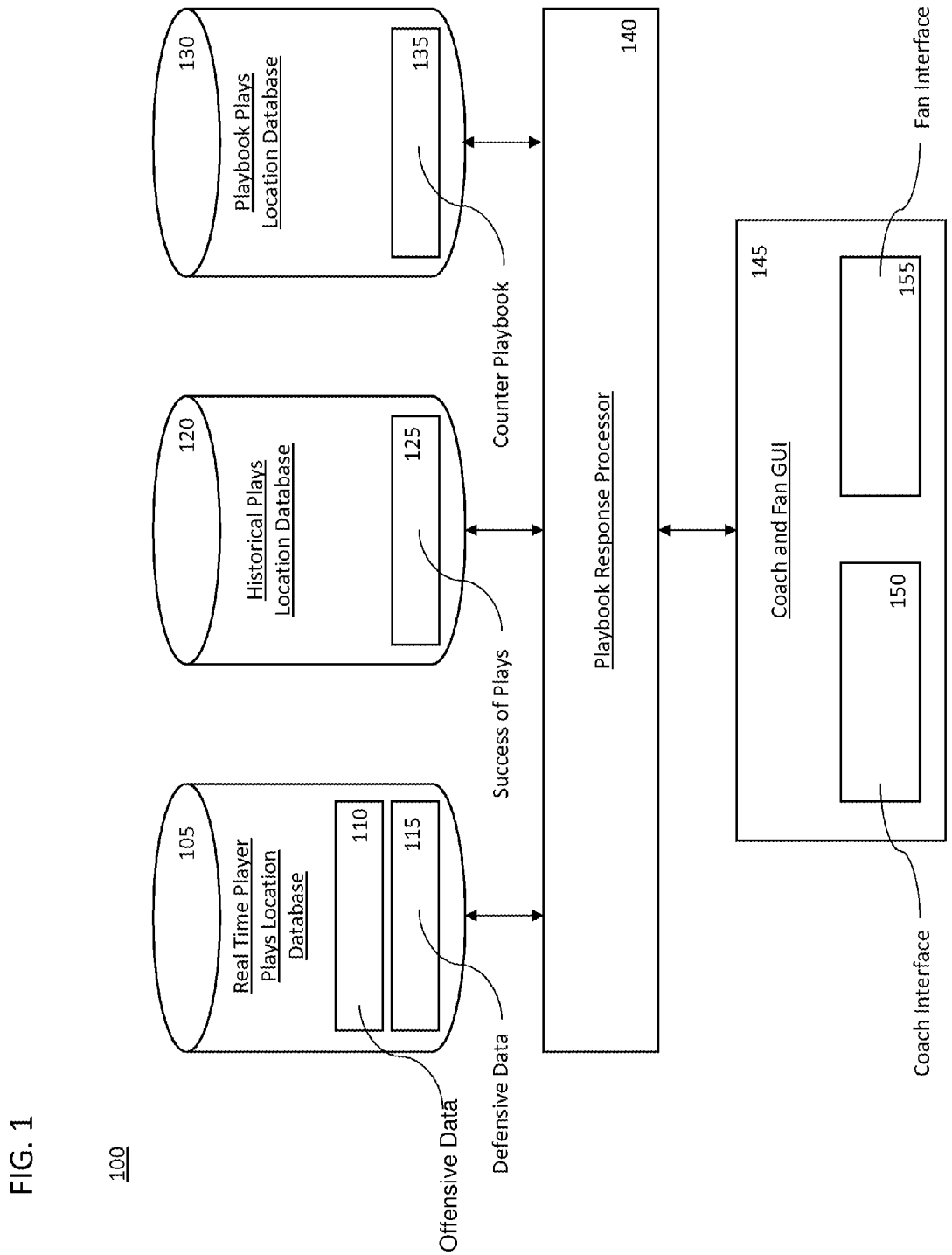
FIG. 1 illustrates a system for processing playbook plays.

FIG. 1 illustrates a system 100 for processing playbook plays. The system 100. The system 100 includes a variety of different elements including databases used to store obtained sports data related to the players (e.g., geolocation) 105, plays from one or more playbooks 130, and information about the executed plays from the one or more playbooks 120. The system 100 also includes a processor 140 for processing the information from the three databases 105, 120, 130 so that the user (e.g., coach, fan) can view the information on a graphical user interface (GUI) 145. Further details pertaining to the different elements of the system 100 is provided below.

With respect to the real-time player plays location database 105, this database houses sports data obtained for each player. Exemplary sports data obtained from each player may include their location (e.g., geolocation). Such sports data may be obtained from one or more sensor associated with each player. The sensors may be mounted, affixed or embedded on each player (e.g. jersey, helmet, padding). Sensors may also be placed on the football for the purposes of obtaining the location of the football in real time. In this way, sports data relating to the position of every player on the field as well as the location of the ball can be collected and used.

The information stored in the real-time player plays location database 105 may be separated into various subgroups. For example, the real-time player plays location database 105 may separate data between the different teams playing in the particular sporting event. The database 105 may also separate each group of data of each team between their data concerning their offense (e.g., offensive data 110) and their defense (e.g., defensive data 115). Such separation of the sets of data between teams may prove beneficial since each team may have their own respective playbooks having distinct plays. Furthermore, separation between offensive data and defensive data for each team may prove beneficial as well since the plays associated during the offensive phase and the defensive phase for a particular team are distinct as well.

The historical plays location database 120 stores all the measured sports data for one or more plays that have been executed. The historical plays location database 120 may organize the data based on individual plays. The sports data associated with each executed play may include information, for example, describing the success of the play 125. Exemplary information used for evaluating success 125 of a particular play may include how many times a particular play was run and on average how much yardage was gained or lost each time the play was executed.

The playbook plays location database 130 stores the theoretical plays that one or more teams can utilize. The information stored in the database 130 would include the details of how a play is executed. More specifically, for each player, instructions of how to run the play (i.e., where the player sets up and where the play moves to) are provided. The plays stored in the playbook plays location database 130 may include plays that were previously drawn out using graphics or drawn out on paper so that any one player would know his location on the field and his role. The information now previously provided visually using graphics or paper is stored in the database 130.

The playbook plays location database 130 may include the playbook for one or more teams. In situations where the playbook plays location database 130 includes plays of the two teams participating in the same game, a counter playbook 135 may also be available. The counter playbook 135 may be used by users of one team (e.g., players, coaches) to determine what play could be used to better success based on the predicted play the opposing team is planning on using. The counter play from the counter playbook 135 can be used to identify a different play to run based on, for example, on how the opposing players are situated prior to the execution of the original play.

The playbook processor 140 is software that looks at information from the real-time player plays location database 105, historical offensive and defensive plays location database 120 and the playbook plays location database 130 to provide corresponding information requested by the user. For example, the playbook processor can provide the user with the best play from the playbook to be used, historical data about that chosen play and how well each of the players generally execute the chosen play. In some embodiments, the playbook processor 140 can evaluate how the opposing team is situated in order to provide a counter play that can be used. The counter play could be a different play than what was originally chosen aimed at providing a more successful result by, for example, catching the opposing team off guard. In one such situation, the counter play may advise that a throw-based play could be more successful based on how the defense is lined anticipating a possible run-based play. The playbook processor 140 would be capable of evaluating the location of each player on both teams (e.g., offense and defense) and provide for each side an ideal play to run for that moment in time.

The information from the playbook response processor 140 is then provided to the GUI 145 which allows users to view a variety of information that can be requested. Depending on the user (e.g., fan, coach), different types of information can be provided through the use of different types of interfaces. Although the coaches, players and fans may be capable of accessing the same information, it may be desired to provide coaches and players with additional information (e.g., personal biometric information of the players) that fans would not be capable of obtaining.

Figure 2:
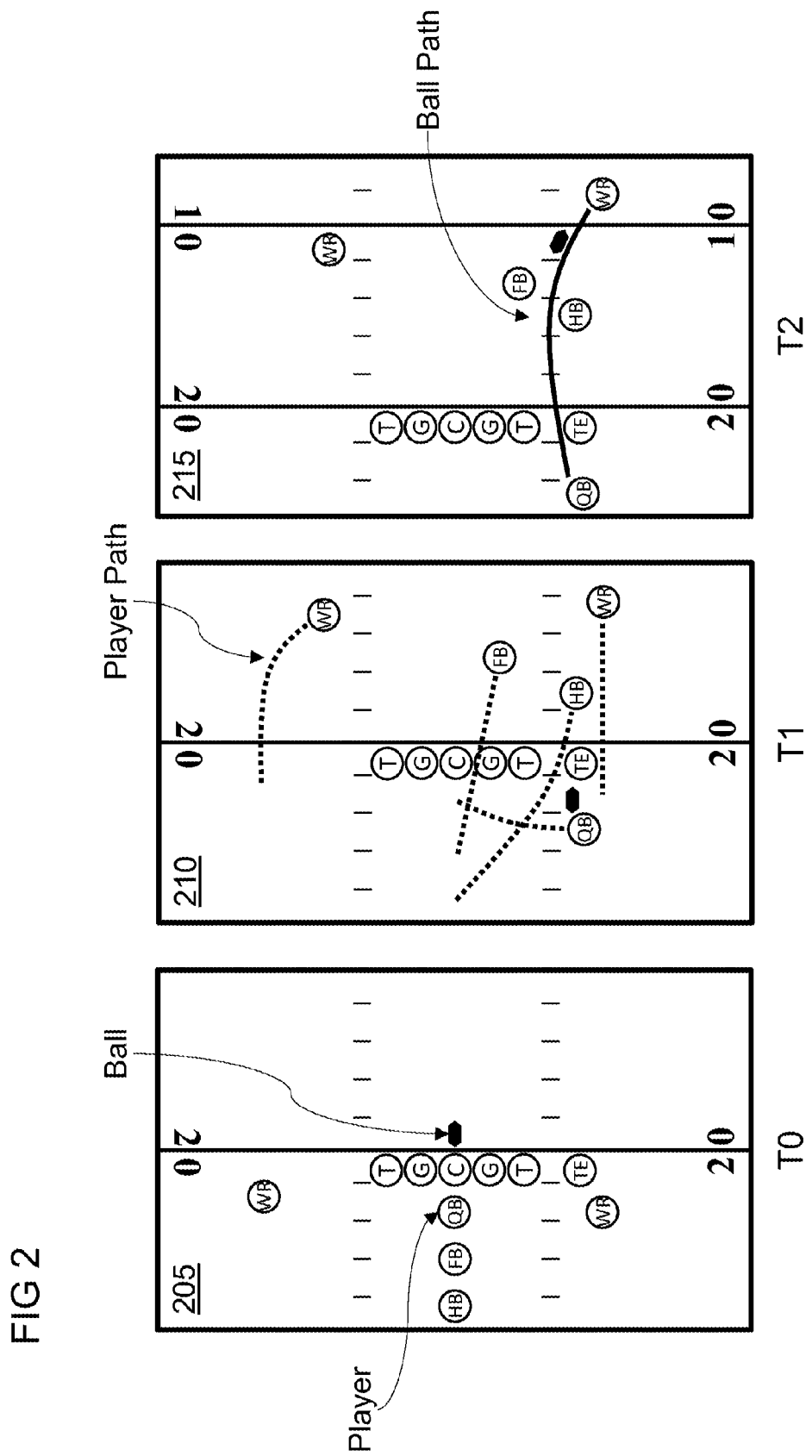
FIG. 2 illustrates an implementation of the system for monitoring offensive plays for one team.

FIG. 2 illustrates an implementation of the system for monitoring offensive plays for one team. More specifically multiple real-time images/diagrams of the offensive team have been captured showing positions of the players and the football at a particular point in time. The positions of each of the players are also indicated in the diagram. It may also be possible to identify the players via their player number or name (i.e. last name).

With reference to FIG. 2, the figure illustrates three conceptual diagrams/real-time images illustrating the offensive team on the football field at three different periods of time denoted as T0, T1 and T2. The three conceptual diagrams are all focused around the line of scrimmage where an offensive play will generally be initiated. With reference to the different time periods captured, T0 may correspond to a time before the snap, T1 may correspond to a time shortly after the snap (i.e. after the offensive play has been initiated) and T2 may correspond to a different period of time after the snap (i.e. after the offensive play has been executed).

With reference to the diagrams, lines may be used to illustrate the path of each of the players and/or the ball. For example, dotted lines can be used to illustrate the path where a particular player moved on the field compared to their starting position denoted in T0 (as illustrated in T1). Additionally, a solid line can be used to illustrate the direction the football was thrown by the quarterback (as illustrated in T2).

It should be noted that additional time periods may also be captured and monitored. With the use of more time periods, an offensive play can be broken into more segments that can be monitored thereby providing a more detailed progression of how an offensive play is executed.

It should be noted, at least in FIG. 2, only the offensive team along with the position of the football has been included in the diagrams/real-time images. In other embodiments, inclusion of the defensive team can also be implemented. Along with the movement of the offensive players, information about how the defensive team responded can also be included. In this way, the monitoring of how the defensive play is executed based on the executed offensive play can also be performed.

FIG. 3 illustrates an evaluation of one particular player during an offensive play. More specifically, FIG. 3A monitors the position of the player during different time periods (i.e. T0, T1, T2, T3). Meanwhile, FIGS. 3B-3D evaluates the position of the player executing a particular play and compares it with past execution of the play and/or the theoretical actual play that the player should have executed. It should be noted that other embodiments may illustrate more than one player at a time executing a play. These situations may arise when two or more players may need to operate in tandem to execute a play (e.g., one player executes a screen for another player).

With reference to FIG. 3A, one player (identified as '1') is being evaluated during execution of play #151. The figure includes snapshots of the position of the player during execution of the play at four different times where T0 may be prior to the snap at the line of scrimmage while T1, T2 and T3 are later times at regular intervals from each other (e.g., 5 seconds, 10 seconds, 15 seconds after the snap). A dotted line may be used to illustrate a general path the player may have taken while traveling from one point to another. It should be noted that the play (e.g., play #151) can be one of many plays that a team can execute during the game.

With reference to FIG. 3D, an exemplary play is shown with reference to the same play. In particular, the exemplary play may correspond with the actual play that the coach intended that the particular player run. To denote the actual execution of the desired play, the figure may include a solid line (as opposed to a dotted line as illustrated in FIG. 3A) where the solid line indicates an actual path that the player should have moved along in order to properly execute the play as planned.

Aside from the illustration of the theoretical play that should be executed by the player as seen in FIG. 3D, information regarding the play (e.g., the curve and the x, y coordinates corresponding to the path) describing how the play should be executed by one or more players is also stored (e.g., playbook plays location database) and is referenced by the playbook processor when later evaluating how well the player executed the play.

With reference to FIG. 3C, an illustration combining the theoretical play that would be executed by a particular player (as shown in FIG. 3D) with one or more past executions of the same play by the player is shown. In particular, three past executions of the play (labeled as H1, H2 and H7) have been included in the figure (illustrated via dotted lines) have been included with the theoretical play as illustrated in FIG. 3D (illustrated with a solid line). The lines indicate the path by which the player would move along. With use of FIG. 3C, one would be capable of evaluating how well the player has been executing the actual play by comparing the historical paths (dotted lines) with the actual play (solid line).

With reference to FIG. 3B, the most current attempt (as illustrated in FIG. 3A) has also been included along with the historical data and the actual play to be executed. A comparison of the most current attempt can be made alongside the historical attempts (illustrated via dotted lines) and the theoretical actual play (illustrated with a solid line). This comparison can be used to evaluate how well the player has been executing the play.

In another embodiment, as described below, the curves for one or more players corresponding to the most current execution of a play can be used by the playbook processor to identify potentially what play was just executed by the team. The playbook processor can compare the most recent data (e.g., most current execution of a play) of one or more players with data of the actual plays stored, for example, in the playbook plays location database in order to guess what play was actually run.

Figure 4:
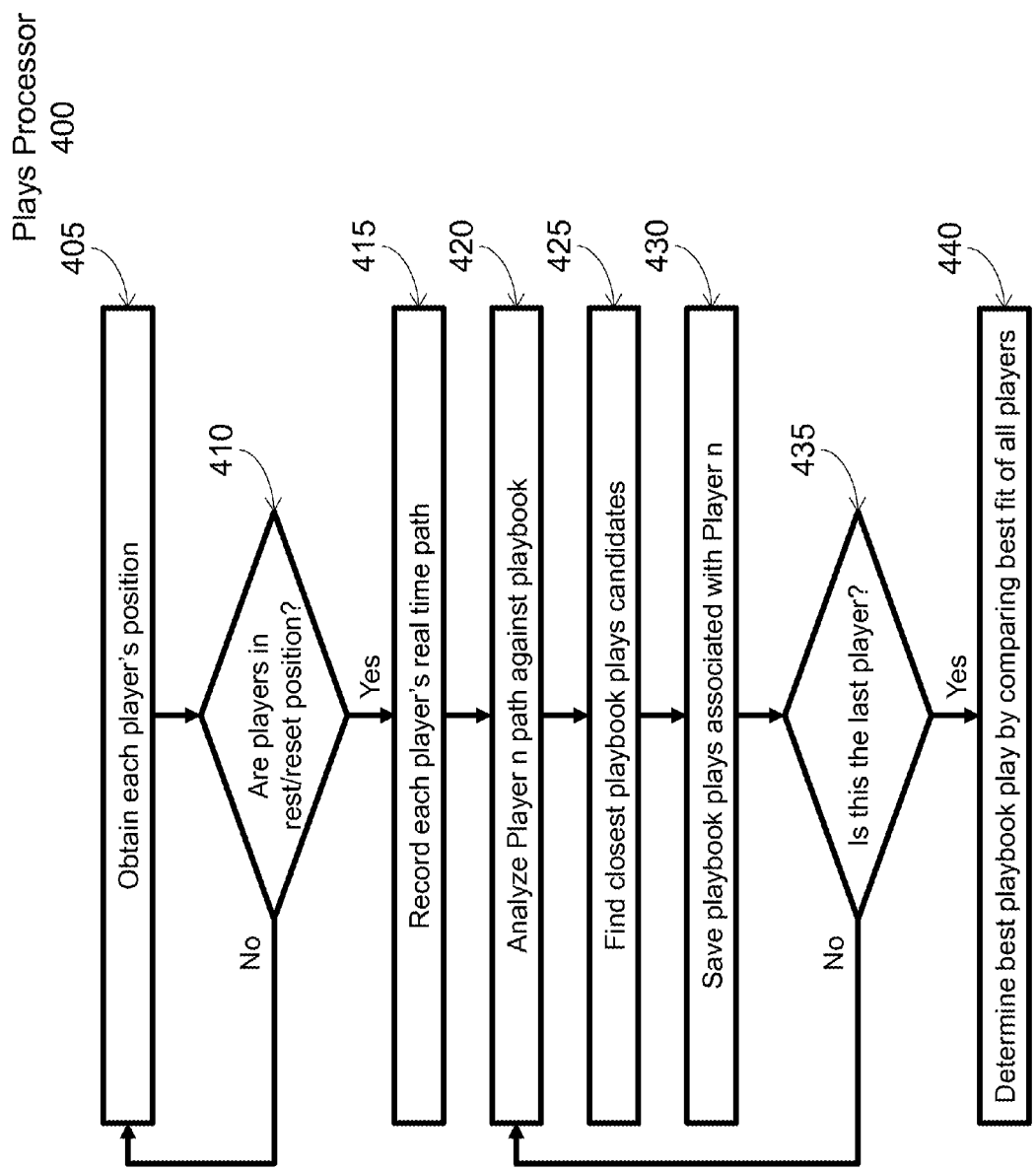
FIG. 4 illustrates a flowchart for the playbook processor for evaluating offensive plays.

FIG. 4 illustrates a flowchart 400 for the playbook processor for evaluating offensive plays. More specifically, the flowchart performs a number of steps in monitoring and evaluating the executed plays of one or more players in order to determine what play was most recently run.

In step 405, the playbook processor obtains an initial position of one or more players. The initial position may correspond with a set position that the one or more players are assigned to before executing the play. For example, the players may be assigned a particular position at the line of scrimmage prior to the snap (i.e. indication that the play is being executed). The initial position may correspond with the label T0 (as illustrated, for example, in FIGS. 3A and 3B).

In step 410, the playbook processor performs and evaluation as to whether the current positions of one or more players correspond to the initial positions (i.e. rest/reset position). There may be situations where one or more players shift or re-adjust their position prior to the snap. If a readjustment is performed by one or more players, the playbook processor can record the new initial position (via step 405). Otherwise, the playbook processor can proceed with recording the execution of the play by one or more players.

In step 415, once the play has begun (i.e. after the snap), each of the positions of one or more players is recorded at regular intervals (i.e. T1, T2, T3). As noted above, T0 corresponds with the initial position prior to the snap while T1, T2, T3 and so one may correspond with positions in time after the snap. The interval chosen for the recorded position may be customized based on the detail of each position of the players as desired. For example, with smaller intervals in time, more details may be obtained regarding the various movements a particular player may have used to get from one point to another. Overall, more details may provide a smoother transition between the initial position and the end position.

With the data obtained in step 415, the playbook processor can evaluate one or more positions of a corresponding player to determine what play from the playbook was just run by that player (i.e. step 420). Evaluation of what was run by the player and what is a theoretical play that may have been run by the player is performed by comparing information about the path of the play. Therefore, the playbook processor compares, for example, x and y directional components of the recently executed play with the x and y directional components of the theoretical play. By looking at the path the player of the recently executed play, the playbook processor can determine which one or more plays most correlated to the recently obtained data (i.e. step 425).

There may be situations where analyzing a single player execution of a play may bring up multiple possible plays. For example, there may be two or more plays that may have a particular player run the same pattern. In any case, each of the possible plays that closely corresponds to what was run by that play can be saved in memory associated with that particular player (i.e. step 430).

In order to better determine what play was run by the offensive team, steps 420, 425 and 430 can be performed with each and every player on the offensive team for which movement data was obtained. Even though one or more players may run a similar pattern in multiple plays, each play should have a distinct difference differentiating one play from another. By analyzing all the players on the offensive plays, the playbook processor can obtain a list of possible plays corresponding to what each respective player could have possibly ran. Each list of possible plays is associated with each player (i.e. step 430).

The best fit (or most probable play that was just executed by the offensive team) can then correspond to the possible play that appears most frequently in the majority of the list of possible plays associated with each player (i.e. step 440). The playbook processor can evaluate each of the list of possible plays for each player. Based on the best fit (or most probable play ran by the respective player), the playbook processor can determine which theoretical play appears the most in all the players. The determination can be used to indicate what play was most likely just executed by the offensive team.

In another embodiment, the best fit may be based on a threshold value corresponding to the correlation between the path ran by each player during the executed play and the paths for the players during the theoretical play. The threshold value may be customizable and set by the user. The threshold value may, for example, allow for some deviation from a play in the playbook without affecting the identification of the path with a particular play. Given the leeway that the threshold value may provide, more than one best fit may be possible.

Figure 5:
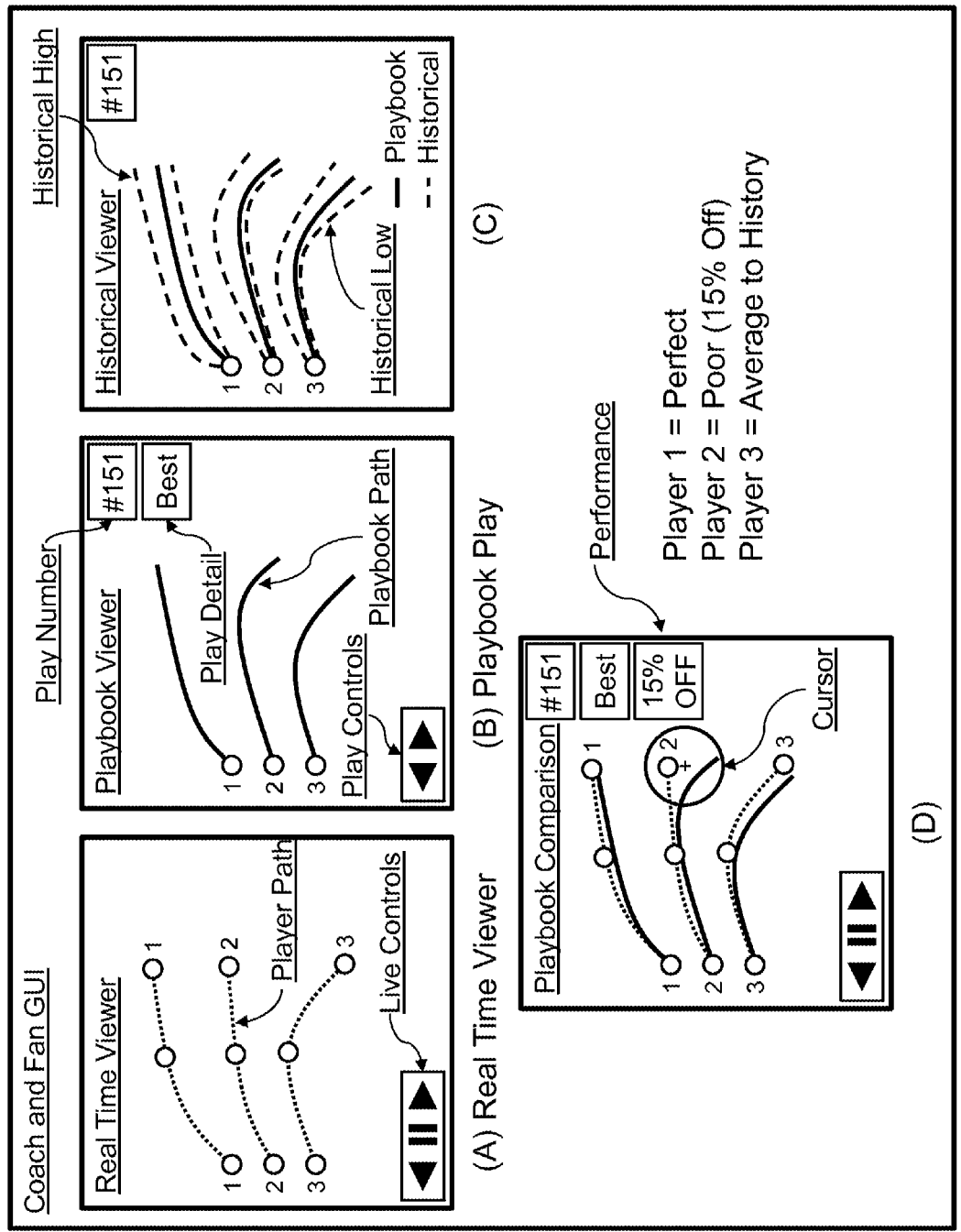
FIG. 5 illustrates the coach and fan GUI for displaying evaluations of the offensive play.

FIG. 5 illustrates the coach and fan GUI for displaying evaluations of the offensive play. The coach and fan GUI may provide one or more windows used to provide information that the playbook processor collected and processed regarding execution of a play by one or more players. For example, the coach and fan GUI may include windows A-D as illustrated in FIG. 5. Window A illustrates a real-time viewer. Window B illustrates a playbook viewer. Window C illustrates a historical viewer. Window D illustrates a playbook comparison. Further details regarding the exemplary windows A-D are provided below.

With reference to window A, an actual recording of one or more players can be viewed. The recording may be directed towards a real-time image/video capture of one or more players executing a play from the playbook. In an embodiment, the coach and fan GUI may be touch screen thereby allowing the user to interact with controls used to manipulate the real-time recording of the executed play. For example, a user may be capable of fast forwarding, rewinding, or pausing the recording of a particular play. The user may also be capable of jumping forward or backwards in time corresponding to particular time segments (i.e. T1, T2, T3).

With reference to window B, the playbook processor can display the "best" theoretical play from the playbook that corresponds with the recently executed play from the one or more players in the football game. The window may also identify the particular play from the playbook (e.g., play #151). Similar to FIG. 3D, the theoretical play executed by the one or more players may provide a starting position for each of the players along with the path the players are instructed to take during the execution of the play, which is denoted using solid lines.

By using the play controls, the user may be capable of viewing other players within the team and their corresponding role within the theoretical play. In some cases, by viewing other players (e.g., a subset of players as opposed to the entire team), the playbook processor may be capable of providing the next "best" theoretical play from the playbook that may have been performed by the other players.

With reference to window C, the playbook processor can combine the theoretical "best" play from the playbook (denoted using solid lines) with one or more historical execution of that same play by the one or more players (denoted using dotted lines). The user viewing the window through the coach and fan GUI can see the variations of the play executed by each of the players against the "best" theoretical play from the playbook.

With reference to window D, the playbook processor can combine all the information provided in windows A-C in order to evaluate how well a particular player executed the play being viewed. The playbook processor may provide an indication of how well the player executed the play (i.e. perfect, poor, average).

Through the use of the coach and fan GUI, as illustrated in FIG. 5, a user (e.g., a fan, coach) knows what the theoretical play being run is as well as is capable of comparing the execution of the play by one or more players against the identified theoretical play. This information pertaining to the identified theoretical play and the evaluation of the execution of the play by the players can be provided to the user close to real-time (e.g., right after the play has been executed).

It should be noted that although embodiments illustrated in the figure only depicts the offensive team and their execution of the play, there may be embodiments may also incorporate the positions and actions of the defensive team as well. The information pertaining to the defensive team may provide further information as to why a particular player deviated from the theoretical play. This information, if used by the playbook processor, may be used to better evaluate performance of a particular player according to the theoretical play from the playbook.

The embodiments described above are mainly directed towards the offensive team. For example, recording of one or more players can be used to evaluate what play was run and how well a particular player executed the play. This information can be provided to users (e.g., fans and coaches) so that they can better understand what is happening during the football game.

With reference to the defensive team, similar features as described above can also be applied in order to monitor the actions of one or more players on the defensive team. Some of the features are directed at monitoring and evaluating execution of defensive plays by one or more players on the defensive team. In some embodiments, however, the information pertaining to the defense can also be used by the offensive team to improve performance against the defense by predicting what the defense plans on doing and choosing a corresponding "counter-play" to the chosen defense.

Figure 6:
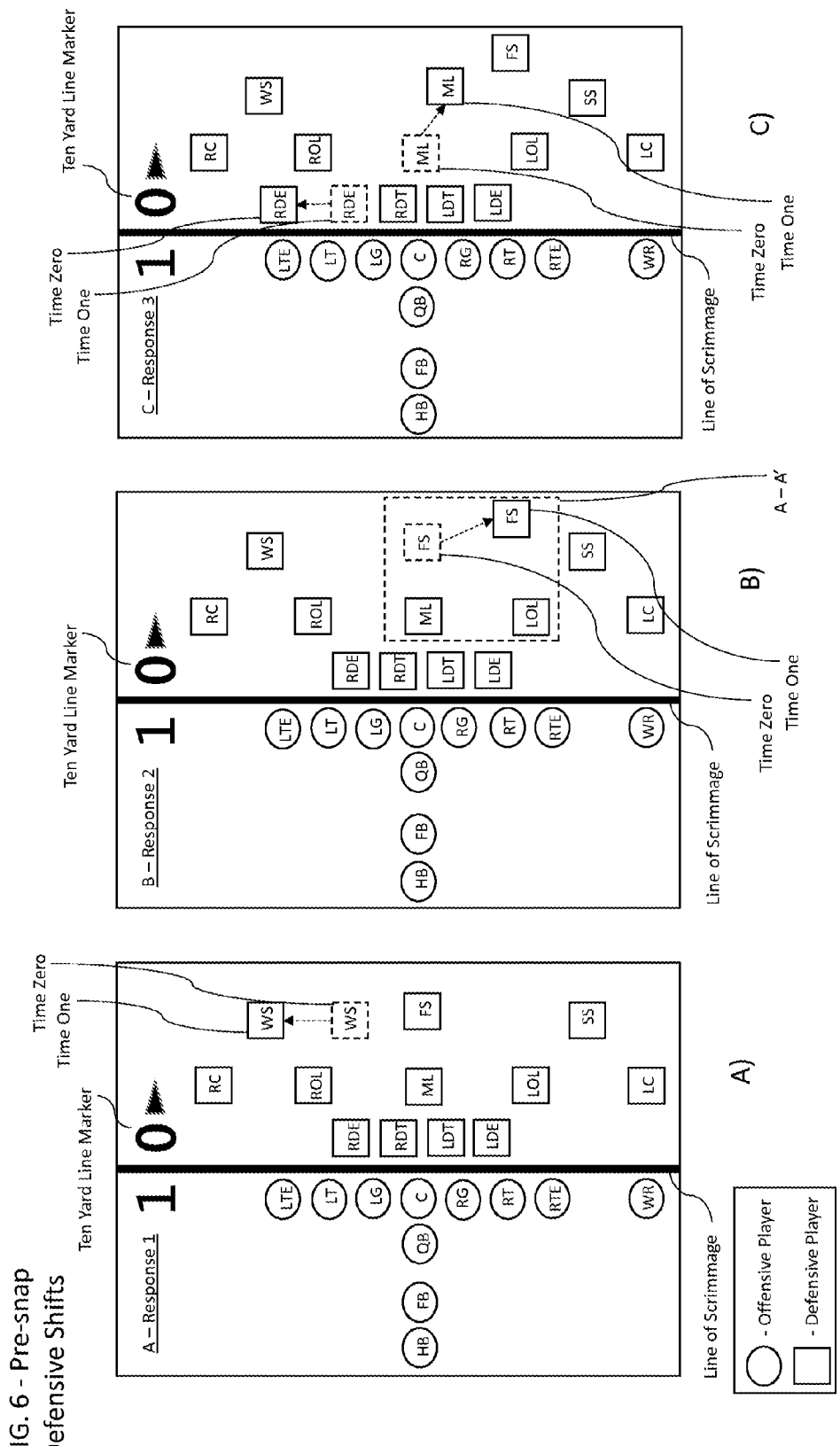
FIG. 6 illustrates an implementation of the system for monitoring defensive plays for one team.

FIG. 6 illustrates an implementation of the system for monitoring defensive plays for one or more players on the defensive team. More specifically, the figure monitors how one or more defensive players are lined up at the line of scrimmage based on the starting position for the offensive team.

FIG. 6 illustrates both the offensive team (depicted with circles) and the defensive team (depicted with squares) centered on the line of scrimmage. At least with reference to the offensive team, each of the players on the defensive team may be assigned to an initial starting position prior to the start of the play (i.e. T0). With reference to the defensive team, the three figures (A, B and C) illustrate exemplary depictions of shifts in the defense by one or more players prior to the start of the play. For example in A, the WS (safety) is depicted as shifting from an initial position associated with T0 (illustrated as a dotted box) to a different position associated with T1 (illustrated as a solid box). A dotted arrow shows the motion between the starting and second position of the WS. Similarly, B and C shows shifts between the initial positions associated with T0 for the FS, RDE and ML.

The motions/shifts that are performed as illustrated in A, B and C show defensive players (e.g., WS, FS, RDE, ML) shifting around before the snap (i.e. beginning of the offensive play). These shifts may have occurred based on how the offensive team initially set up and the respective players adjusting their starting position in order to pair up with who the player may be assigned to cover. At least in FIG. 6, both T0 and T1 correspond to periods of time prior to the start of the play (i.e. snap of the football).

Figure 7:
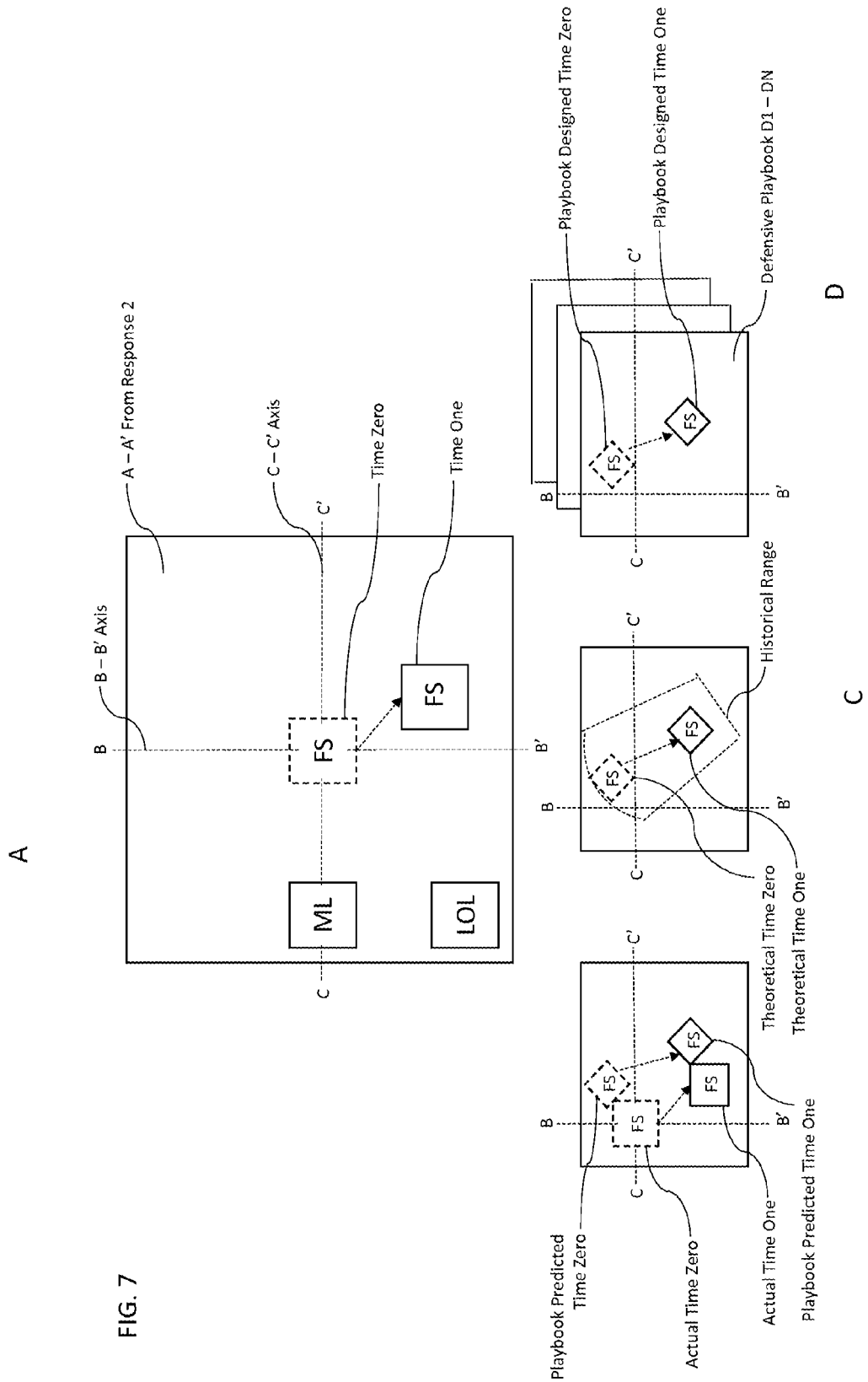
FIG. 7 illustrates a further detailed monitoring of one particular player during a defensive shift.

FIG. 7 illustrates a further detailed monitoring of one particular player during a defensive shift. Similar to FIG. 3 where the one or more offensive players were monitored in detail (i.e., recently executed play, theoretical play from the playbook, historical execution of the play and comparison), the present figure provides similar information at least from the perspective of one or more defensive players.

With reference to FIG. 7A, a recording of one of the defensive players (e.g., FS) is taken at two different time periods (i.e. T0 and T1). The initial position of the defensive player at T0 is depicted with a dotted box and the new position of the defensive player at T1 is depicted with a solid box. A dotted arrow is used to illustrate the direction the defensive player took in order to move from the initial position to the new position.

As seen in FIG. 7A, details pertaining to the defensive shift may be taken with respect to the other plays on the defensive team (e.g., ML, LOL). For example, the shift may be induced in order to compensate for any potential holes in the offense. The inclusion of one or more relevant defensive players may be possible. Furthermore, details pertaining to the axis (e.g., B-B' and C-C') can be used to quantify the defensive shift from the initial position to the new position.

As seen in FIG. 7D, there may be a playbook play for the defensive position (i.e. FS). In particular, there may be situations where a particular player is instructed to go based on a particular read (e.g., whether the offensive play is a run or a pass). A play for the defensive position may require the player to be in one position if the offensive play is a run and a different position if the offensive play is a pass. The defensive playbook would have one or more plays describing where each of the players on the defense are supposed to go based on the offense.

With reference to FIG. 7C, a historical range is provided for one or more defensive players. Similar to the offensive player in FIG. 3C, even though the defensive player may be instructed to perform a particular defensive shift in responding to the offensive, there may be variations of the play for one or more reasons. FIG. 7C provides a general area enclosed via a dotted polygon that dictates where the particular defensive player has been known to move to.

With reference to FIG. 7B, a prediction of the potential defensive play is displayed alongside the recorded executed defensive shift (as illustrated in FIG. 7A). The playbook processor may be capable of providing one or more defensive plays from the defensive playbook corresponding to the recorded defensive shift performed by the particular player. A comparison between the actual and predicted defensive shift can be performed by the user from the use of the display of the information (as seen in FIG. 7B).

The knowledge of how one or more defensive players shift based on a perceived offensive play chosen by the offense (based on how the offense lines up at the line of scrimmage) can be useful in predicting how the defense will react to the execution of the play. As described below, the knowledge of how the defense shifts (and therefore prepares for a particular offensive play) can also be used to produce one or more "counter-plays" that can be executed. The "counter-plays" may be helpful for the offensive team in choosing one or more alternate offensive plays that can be used based on the new defensive formation (post defensive shift).

Figure 8:
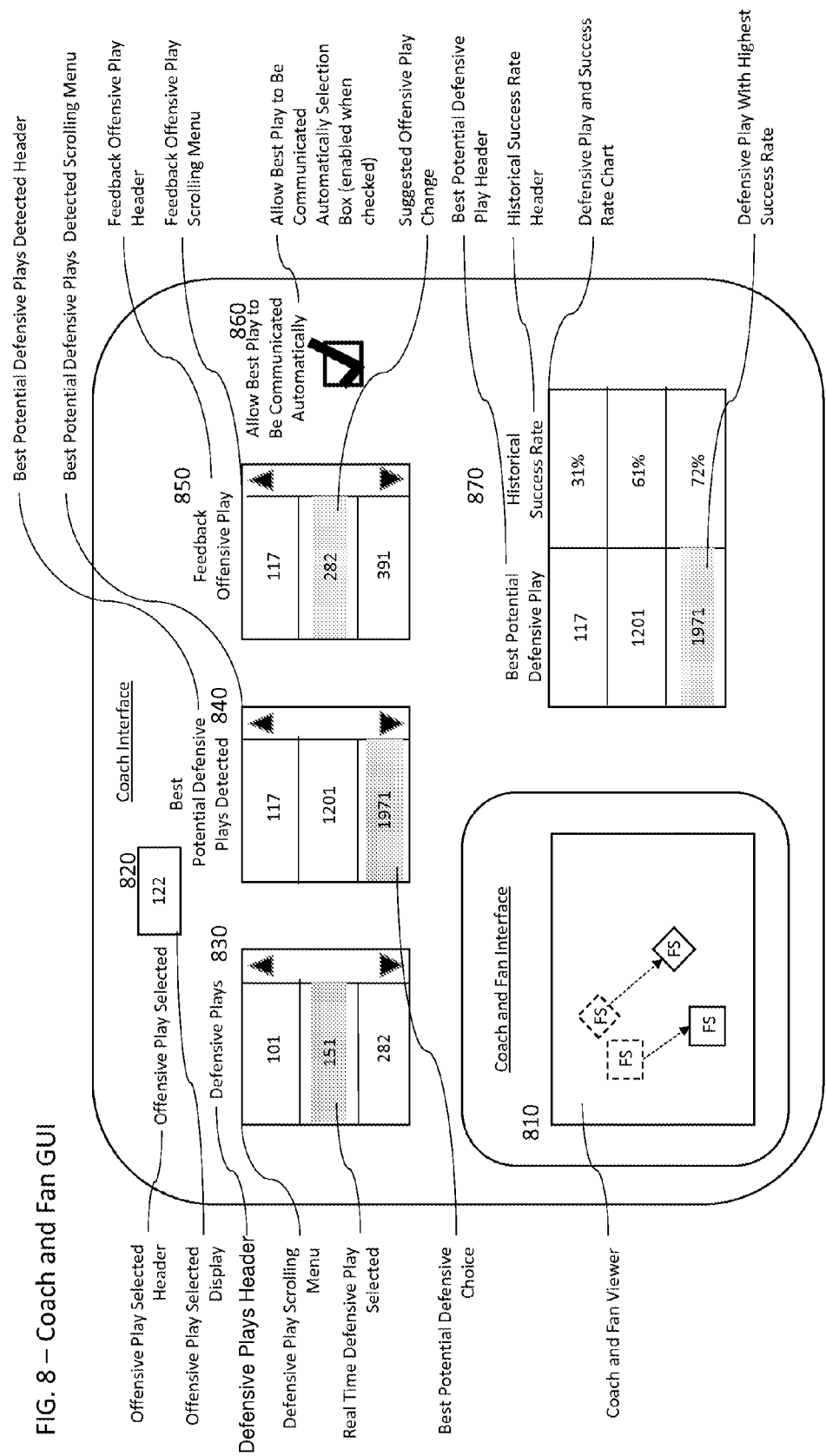
FIG. 8 illustrates the coach and fan GUI for simultaneously displaying offensive and defensive play data.

FIG. 8 illustrates the coach and fan GUI 800 for simultaneously displaying offensive and defensive play data. The information processed by the playbook processor can be displayed on the GUI 800 for viewing by the user (e.g., fan, coach).

With reference to the coach and fan GUI 800, there may be an interface 810 that allows the user (e.g., coach, fan) to view the defensive shifts by one or more players. For example, the user may be capable of viewing how the defensive player (e.g., FS) recently shifted from an initial position to a secondary position. The user may also be capable of viewing how the FS should have set up and shifted to the secondary position. This information may be similar to the information displayed in FIG. 7. It should be noted that this information may be viewable by both the coach and fan alike.

With reference to the remaining features of the coach and fan GUI 800 (e.g., 820-870), these features may include information that only a coach may be authorized to see. In particular, this information may be beneficial to the coach that is responsible for advising/instructing what plays should be run on the offensive team.

Dictating what information can be seen by the fan versus a coach can be based on the types of information available to the respective user. In situations where the databases are associated with a particular owner (i.e. user), a coach may have specialized information that a fan does not have that can be used to provide the information illustrated in elements 820-870. For example, a coach has access to information about their own playbook. Furthermore, the coach may have spent resources obtaining information about the playbook of the opposing team (e.g., viewing past game footage, scouting). These types of information can be inputted by the coach so that the playbook processor can process the information in order to output information shown in elements 820-870. In contrast, the average fan may not have access to such information (e.g., playbooks for both teams). Therefore the playbook processor may be incapable of providing the calculations for the fan.

It may also be possible that certain information may be tagged as being authorized for viewing by particular individuals only (e.g., "coach-only"). In situations where all information about offensive and defensive plays are stored on a central set of servers, such information may be defined as proprietary information for particular users (e.g., a coach or particular team) and unauthorized users (e.g., fans) may not be allowed access to or utilize the information.

With reference to element 820, a section can be used to indicate the particular offensive play that is initially chosen to be run. The offensive play that is chosen may be labeled with an identification number (e.g., 122). The element may be capable of opening a sub-window in order to display for the user the details of the chosen offensive play.

With reference to element 830, the user (e.g., offense coach) may be capable of viewing a perceived defensive play that is currently being implemented by the defensive team. More specifically, the playbook processor may be capable of accessing and listing all known defensive plays in a list for the user to scroll through and select. The user may be capable of recognizing some patterns that can be used to identify what the defensive play may be using. The user can then select the particular defensive play and view the details of the play.

It should be noted that the database storing the potential defensive plays performed by the defensive team can be provided in a number of ways. For example, the various defensive plays of the defensive team may have been monitored in the past and inputted into the database by one or more different users (e.g., scouts, players, coaches). Game footage of past games can be viewed in order to compile a database for a particular team.

In some embodiments the playbook processor may be able to provide a best detected potential defensive play (e.g., element 840) based on the information already stored in the database for known defensive plays. Similar to how information about the offensive players can predict what play was performed based on the movements of one or more players, based on the positional information of one or more defensive players, the playbook processor can compile a list of potential plays from the defensive playbook. The list can then be viewed by the user in order to understand what the defensive team may be reacting to.

With reference to element 850, the playbook processor may produce a list of plays that could be used in place of the currently selected offensive play 820. The list of new plays (also referred to as counter-plays) 850 may be deemed to have a higher success rate than the previously selected offensive play 820. The user may be capable of scrolling through the list of possible counter-plays and view details pertaining to the selected counter-play.

With reference to element 860, the chosen new play (for example, the name of the play) can be provided, for example, to the quarterback automatically. In this way, the quarterback may be capable of altering the chosen play verbally at the line of scrimmage (i.e. audible).

With reference to element 870, a list of the detected defensive plays and a historical success rate against the currently chosen play 820 may be provided to the user to view. The historical success rate may be based on past game data compiled. What is considered a defensive "success" may be customized by the user. For example, the user may be capable of defining success as any offensive attempt that does not gain more than a certain number of yards (e.g., two or less yards allowed). Situations where the offensive play resulted in an incomplete pass or a turnover may be equivalent to zero yards gained. In any case, the user can view evaluate whether or not the currently selected offensive play 820 should be used based on the information provided in element 870.

It should be noted that other types of information may also be included within the coach and fan GUI that is not described above or illustrated in FIG. 8. Such information may be beneficial in facilitating what play should be chosen and/or how the offense can prepare for the defensive play. For example, the coach and fan GUI 800 may further include information regarding how well the chosen offensive play has performed such as average yardage gained, first down conversion rate, and the number of touchdowns scored. This additional information may similarly be restricted, for example, such that it may only be viewed by authorized users (e.g., coaches).

Figure 9:
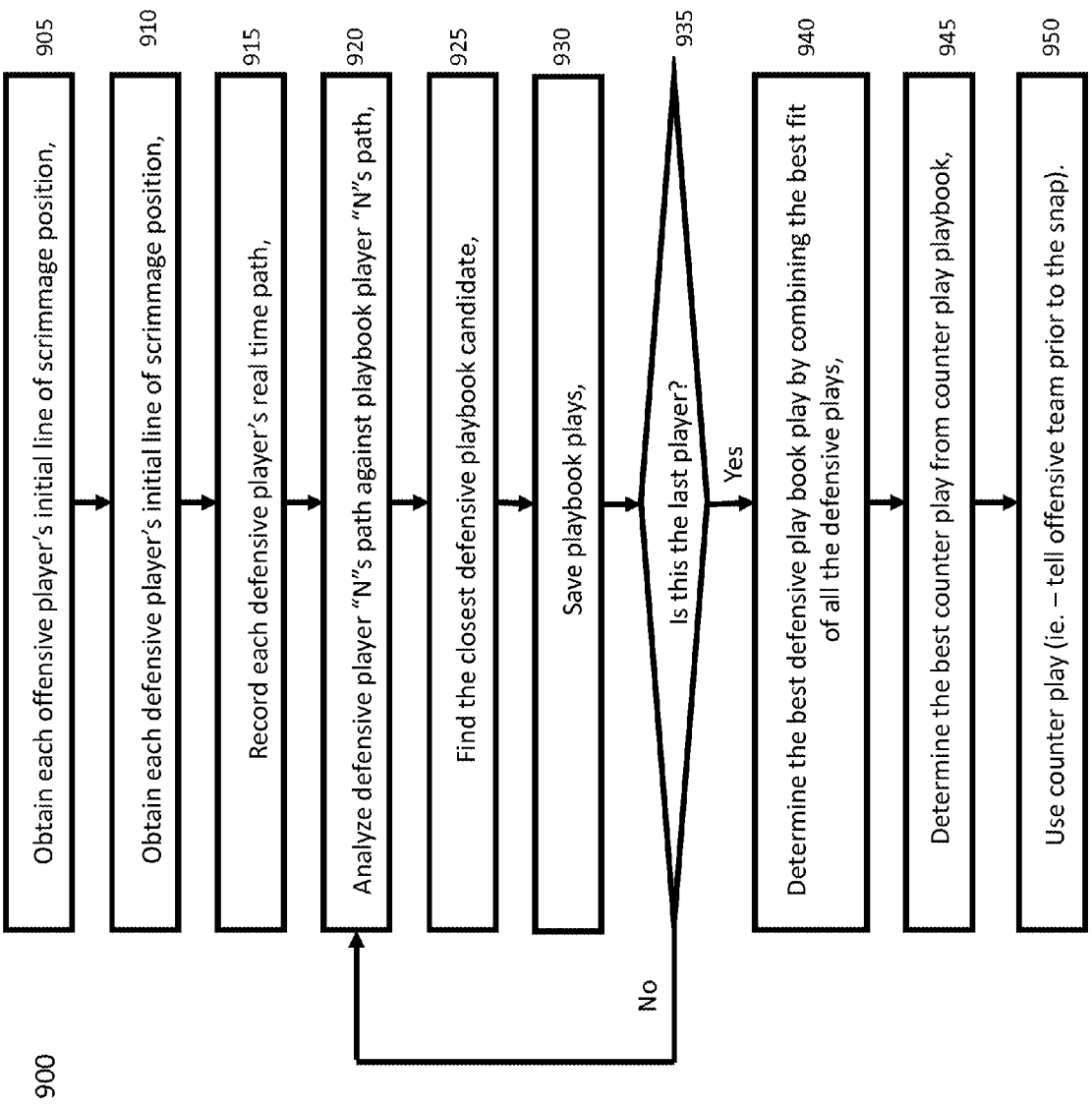
FIG. 9 illustrates a flowchart for the playbook processor for determining a counter play based on an observed defensive play.

FIG. 9 illustrates a flowchart 900 for the playbook processor for determining a counter play based on an observed defensive play. More specifically, the playbook processor provides the offensive team (e.g., coach and/or quarterback) with a better offensive play in view of the detected defensive play.

In step 905, the playbook processor may obtain information about each of the initial position for the players on the offensive team at the line of scrimmage prior to the initiation of the play (e.g., before the snap). The initial position for the players on the offensive team may be based on an initially chosen offensive play currently being run by the quarterback.

In step 910, the playbook processor may also obtain at this time information about each of the initial positions for the players on the defensive team at the line of scrimmage prior to the initiation of the play (step 910). The initial positions for the players on the defensive team may be based on an initial chosen defensive play currently being run by the defense.

In step 915, the playbook processor can monitor any movements by one or more players on the defensive team. The movements monitored by one or more players on the defensive team may be based on, for example, the initial positions of the offensive team. The movements monitored by one or more players on the defensive team may also be based on perception by the defensive team as to what offensive play may be run by the offensive team. In any case, the movements of each of the players on the defensive team are recorded.

In step 920, the playbook processor can analyze the movements of the one or more players on the defensive team against one or more known plays in the defensive playbook. In step 925, the playbook processor attempts to identify the possible defensive plays that the defensive team is executing (e.g., man-to-man coverage, blitz) based on the movements of one or more players on the defensive team.

In step 930, the information obtained regarding the movements of the one or more players on the defensive team are saved for future reference. For example, if the movements correspond to a "new" play that was not previously known by the user (e.g., coach), the playbook processor can store the information for future reference.

An analysis of each of the players on the defensive team is reviewed (e.g., 920-930) by the playbook processor (e.g., step 935). The analysis of each of the players on the defensive team is to ensure that the best defensive play is chosen from the list of possible known defensive plays (e.g., step 940). There may be more than one play corresponding to a particular movement of a player on the defensive team. With the incorporation of multiple players, however, the playbook processor can narrow down all available plays in the defensive playbook into a few possible plays for the user to view.

In step 945, the playbook processor can provide the user with one or more counter-plays (or alternative offensive play) to use in view of the detected defensive play by the defensive team. The choice of counter-play may be based on the corresponding success rate of a particular play against the detected defense. As noted above, "success" may be customized by the user.

In step 950, the information pertaining to the counter-play may be provided, for example to the quarterback. In some embodiments, the coach may be capable of providing the information (e.g., headset, signals) to the quarter back prior to the snap. Upon receiving instructions, the quarterback may be capable of changing the previously selected offensive play to the new counter-play but providing audible instructions to the other members of the offensive team. Presumably the counter-play will have a higher success rate against the detected defense than what was originally chosen as the offensive play (e.g., corresponding to the initial set up in step 905).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

Although the specification and figures may provide various embodiments directed to use of the technology herein within the realm of American football, it should be noted that the technology can be used in a variety of different events and venues including entertainment or cultural events presented at a theater, gymnasium, stadium or other facility involving a group of people. Such events may also include a variety of sporting events such as football (American and global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as museums or historic homes.

What is claimed is:

1. A method for comparative sports performance analysis, the method comprising:
   storing a plurality of stored paths in memory, each stored path stored in association with at least one of a plurality of possible plays;
   receiving a plurality of measured locations of a first player while the first player is performing a first play over a first time period, the plurality of measured locations received from one or more sensor devices;
   identifying a player path based on connecting the plurality of measured locations;
   identifying that one or more matching stored paths of the plurality of stored paths match the identified player path, wherein each matching stored path is identified as being within a pre-determined deviation threshold of the identified player path and as being associated with a stored play corresponding to the first play of the plurality of possible plays;
   generating a player performance evaluation based on a comparison between the identified player path and the one or more matching stored paths stored in the memory; and
   providing the player performance evaluation to a designated interface device.

2. The method of claim 1, wherein the player performance evaluation indicates that the first player performed the first play in a manner that corresponds to the one or more matching stored paths.

3. The method of claim 1, wherein the player performance evaluation indicates that the first player performed the first play in a manner that deviates from the one or more matching stored paths.

4. The method of claim 1, wherein the player performance evaluation indicates how closely a manner in which the first player performed the first play corresponds to the one or more matching stored paths.

5. The method of claim 1, wherein the one or more matching stored paths include an ideal path for the stored play corresponding to the first play.

6. The method of claim 5, wherein generating the player performance evaluation comprises comparing the identified player path to the ideal path for the stored play corresponding to the first play.

7. The method of claim 1, wherein the one or more matching stored paths include historical data regarding historical performance of the stored play corresponding to the first play.

8. The method of claim 7, further comprising identifying a historical success rate of the first play based on the historical data.

9. The method of claim 7, further comprising:
   identifying a plurality of counter-plays responsive to the first play based on the associated historical data of the one or more matching stored paths;
   identifying a success rate for each identified counter-path based on the historical data; and
   identifying one of the identified plurality of counter-paths that is associated with a best success rate of the plurality of counter-plays.

10. The method of claim 7, wherein generating the player performance evaluation comprises comparing the identified player path to an average historical path of the one or more matching stored paths.

11. The method of claim 1, wherein at least one of the one or more sensor devices is coupled to the first player.

12. The method of claim 1, wherein each stored path includes an ideal path and associated historical data.

13. A system for comparative sports performance analysis, the system comprising:
   one or more databases that store a plurality of stored paths, each stored path stored in association with one of a plurality of possible plays;

a communication interface that receives a plurality of measured locations of a first player while the first player is performing a first play over a first time period, the plurality of measured locations received from one or more sensor devices; and a processor that executes instructions stored in memory, wherein execution of the instructions by the processor:
identifies a player path based on connecting the plurality of measured locations,
identifies that one or more matching stored paths of the plurality of stored paths match the identified player path, wherein each matching stored path is identified as being within a pre-determined deviation threshold of the identified player path and as being associated with a stored play corresponding to the first play of the plurality of possible plays,
generate a player performance evaluation based on a comparison between the identified player path and the one or more matching stored paths stored in the one or more databases, and
provide the player performance evaluation to a designated interface device.

14. The system of claim 13, wherein the one or more matching stored paths include an ideal path for the stored play corresponding to the first play.

15. The system of claim 14, wherein the processor generates the player performance evaluation by comparing the identified player path to the ideal path for the stored play corresponding to the first play.

16. The system of claim 13, wherein the one or more matching stored paths include historical data regarding historical performance of the stored play corresponding to the first play.

17. The system of claim 16, further comprising identifying a historical success rate of the first play based on the historical data.

18. The system of claim 16, further comprising identifying a plurality of counter-plays responsive to the first play based on the historical data.

19. The system of claim 13, wherein the player performance evaluation indicates how closely a manner in which the first player performed the first play corresponds to the one or more matching paths.

20. A non-transitory computer readable storage medium having embodied thereon a program, wherein the program is executable by a processor to perform a method of comparative sports performance analysis, the method comprising:
storing a plurality of stored paths in memory, each stored path stored in association with at least one of a plurality of possible plays;
receiving a plurality of measured locations of a first player while the first player is performing a first play over a first time period, the plurality of measured locations received from one or more sensor devices;
identifying a player path based on connecting the plurality of measured locations;
identifying that one or more matching stored paths of the plurality of stored paths match the identified player path, wherein each matching stored path is identified as being within a pre-determined deviation threshold of the identified player path and as being associated with a stored play corresponding to the first play of the plurality of possible plays;
generating a player performance evaluation based on a comparison between the identified player path and the one or more matching stored paths stored in the memory; and
providing the player performance evaluation to a designated interface device.

* * * * *